(12) United States Patent
Bauer et al.

(10) Patent No.: US 6,666,077 B2
(45) Date of Patent: Dec. 23, 2003

(54) SENSOR DEVICE

(75) Inventors: Klaus Bauer, Regensburg (DE); Josef Brem, Stetten (DE); Ronald Henzinger, Regensburg (DE); Markus Molin, Mintraching (DE); Jörg Schindler, Neutraubling (DE)

(73) Assignee: Siemens Aktiengesellschaft, Munich (DE)

( * ) Notice: Subject to any disclaimer, the term of this patent is extended or adjusted under 35 U.S.C. 154(b) by 150 days.

(21) Appl. No.: 09/748,550

(22) Filed: Dec. 26, 2000

(65) Prior Publication Data

US 2001/0004845 A1 Jun. 28, 2001

(51) Int. Cl.⁷ .............................................. G01M 15/00
(52) U.S. Cl. ..................................... 73/118.2; 73/118.2
(58) Field of Search ............................... 374/183, 185; 73/204.22, 756, 866.22, 514.34, 118.2; 62/185; 324/754

(56) References Cited

U.S. PATENT DOCUMENTS

| 4,262,491 A | * | 4/1981 | Chorey et al. ................ 62/185 |
| 4,891,622 A | * | 1/1990 | Llewellyn .................... 338/22 |
| 5,631,421 A | * | 5/1997 | Ohgke et al. ............. 73/514.34 |
| 6,198,297 B1 | * | 3/2001 | Riccioni ..................... 324/754 |

FOREIGN PATENT DOCUMENTS

| DE | 33 27 884 A1 | 2/1985 |
| DE | 27 15 814 C3 | 8/1985 |
| DE | 36 20 246 A1 | 12/1987 |
| DE | 31 34 166 C2 | 1/1988 |
| DE | 37 39 198 C1 | 5/1989 |
| DE | 195 34 887 A1 | 3/1997 |
| DE | 195 34 890 A1 | 3/1997 |
| DE | 197 21 101 A1 | 12/1997 |

* cited by examiner

Primary Examiner—Kamand Cuneo
Assistant Examiner—Monica D. Harrison
(74) Attorney, Agent, or Firm—Laurence A. Greenberg; Werner H. Stemer; Ralph E. Locher

(57) ABSTRACT

A sensor device has a sensor element, two connecting elements configured as a wire and are led out of the sensor element, and a supporting element having a supporting body and two supporting feet to support the temperature sensor in a housing. The two connecting elements, the sensor element and the supporting body bound between themselves a two-dimensional clearance of a predefined width and height. A minimum dimension of the sensor element and the length and height of the supporting feet are dimensioned, relative to the clearance, such that neither the sensor element nor one of the supporting feet can enter the clearance of an adjacent sensor device.

8 Claims, 1 Drawing Sheet

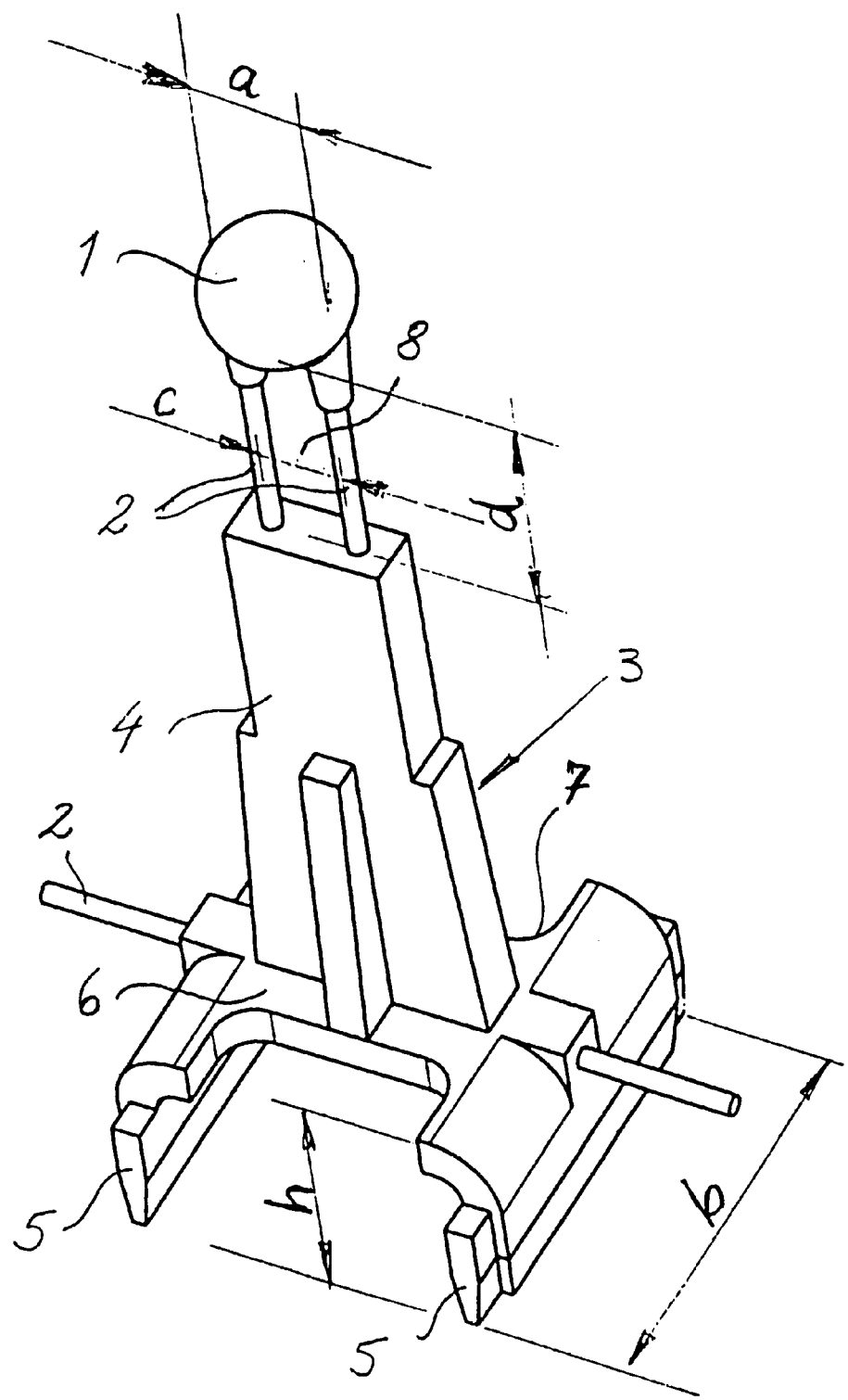

SENSOR DEVICE

BACKGROUND OF THE INVENTION

Field of the Invention

The present invention relates to a sensor device.

In the case of such sensor devices, the sensor element is disposed in relation to the housing in such a way that it comes into contact without hindrance with the medium to be registered (for example the intake air in the intake pipe of an internal combustion engine). Supporting feet of the sensor device are fixed in a housing.

In order to be able to install the sensor device in the housing, they are often supplied by use of a belt. To this end, the sensor device must be fitted to the belt and detached from the latter again for the purpose of installation. This requires a corresponding effort.

This effort may be avoided by the sensor device being supplied as bulk goods. In this case, however, there is the risk that the sensor devices will catch in one another.

SUMMARY OF THE INVENTION

It is accordingly an object of the invention to provide a sensor device which overcomes the above-mentioned disadvantages of the prior art devices of this general type, such that they can be supplied as bulk goods without there being the risk of mutual catching between sensor devices.

With the foregoing and other objects in view there is provided, in accordance with the invention, a sensor device containing a sensor element having one of a spherical shape and a flattened spherical shape with a minimum dimension. Two connecting elements are connected to and extending freely out from the sensor element, the two connecting elements run substantially parallel to and at a predefined distance from one another. A supporting element is provided having a supporting body through which the connecting elements are led, and a supporting foot is integrally molded on the supporting body to support the sensor device when it is installed in a housing. The two connecting elements, the sensor element and the supporting body bound between themselves a two-dimensional, empty clearance of a predefined width and a height. The supporting foot has a form of a plate-shaped part with a predefined length dimension and a height dimension. The predefined length dimension lies transversely with respect to a plane of the two-dimensional, empty clearance and the height dimension lies parallel to the two connecting elements. The minimum dimension of the sensor element and the predefined length dimension and the height dimension of the supporting foot being dimensioned, in relation to the two-dimensional, empty clearance, such that neither the sensor element nor the supporting foot can enter the two-dimensional, empty clearance of an adjacent sensor device of a group of sensor devices supplied as bulk goods.

The present invention is based on the finding that the risk of adjacent sensor devices catching in one another is primarily caused by the sensor element and/or one of the supporting feet entering the clearance between the sensor element, the connecting elements and the supporting body of an adjacent sensor device. According to the invention, the minimum dimension of the sensor element and the length and height of the supporting feet relative to the clearance are dimensioned in such a way that neither the sensor element nor one of the supporting feet can enter the clearance in an adjacent sensor device. In this way, the sensor devices may be supplied as bulk goods without being able to catch in one another, so that they can then be installed completely automatically. This considerably reduces the installation effort as compared with sensor devices supplied on belts.

The invention advantageously provides that, for the case in which the height d of the clearance is greater than the width c of the clearance, the following inequalities apply:

$$b > d \text{ and } h > d \text{ and } a > c$$

and, for the case in which the height d of the clearance is less than the width c of the clearance, the following inequalities apply:

$$b > c \text{ and } h > c \text{ and } a > d,$$

where a is the minimum dimension of the sensor element, b is the length of the supporting foot, c is the width of the clearance, d is the height of the clearance and h is the height of the supporting foot.

In accordance with an added feature of the invention, the supporting body is a plate-shaped part which, together with the two-dimensional, empty clearance, lies in a main plane of the sensor device.

In accordance with an additional feature of the invention, the supporting body has a first end and a second end opposite the first end. The two connecting elements lie in the main plane and are led through the supporting body, running in a straight line from the first end of the supporting body, and, bent at right angles to this, emerge from the second end of the supporting body.

In accordance with another feature of the invention, the supporting foot is integrally molded on the second end of the supporting body.

In accordance with a further feature of the invention, the supporting foot is one of two identical supporting feet, which run parallel to and at a distance from each other, and are integrally molded on the supporting body.

In accordance with another added feature of the invention, the supporting element has a bridge-shaped section which, in the main plane, has a substantially U-shaped cross section, and the supporting foot is connected to the supporting body by the bridge-shaped section.

In accordance with a concomitant feature of the invention, the sensor device is a negative temperature coefficient resistance sensor device and the sensor element is a negative temperature coefficient capsule.

Other features which are considered as characteristic for the invention are set forth in the appended claims.

Although the invention is illustrated and described herein as embodied in a sensor device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, perspective view of a temperature sensor according to the invention.

DESCRIPTION OF THE PREFERRED EMBODIMENTS

Referring now to the single FIGURE of the drawing in detail, there is shown a sensor device, for example, configured as a temperature sensor.

The temperature sensor illustrated in the drawing is a negative temperature coefficient resistance temperature sensor, such as is used for example for registering the temperature in an intake pipe of an internal combustion engine. It is accommodated, for example, with a pressure sensor in a common housing.

The temperature sensor contains a sensor element 1, two connecting elements 2 formed as wires, and a supporting element 3.

In the exemplary embodiment illustrated, the sensor element 1 is configured as a spherical negative temperature coefficient (NTC) capsule. However, its form can deviate from the spherical form and, for example, can have a flattened spherical shape.

The connecting elements 2 extend out of the sensor element 1, running essentially parallel to and at a predefined distance from each other, so that they are exposed adjacent to the sensor element 1. At a predefined distance from the sensor element 1, they enter the supporting element 3. Therefore, the sensor element 1, the connecting elements 2 and the supporting element 3 bound a two-dimensional clearance 8 between them.

The supporting element 3 has a supporting body 4 and two supporting feet 5, which are connected to one another by a bridge-like section 6. The supporting body 4 is configured as a plate-like component which, together with the clearance 8, lies in the main plane of the temperature sensor. The connecting elements 2 are led through the supporting body 4, running in a straight line in an upper end, and are bent over at right angles at a lower end of the supporting body 4, in the area of the bridge-like section 6, so that they emerge laterally in opposite directions from the bridge-like section 6, in order to be connected to a non-illustrated signal processing unit. The configuration in this case is made in such a way that the connecting elements 2, in the entire area of the temperature sensor, lie in its main plane.

The bridge-like section 6, which is provided with a recess 7 on both sides of the main plane, has an approximately U-shaped cross section in the main plane. Legs of the U are formed by the supporting feet 5, which approximately have the form of plate-like parts. The supporting feet 5 are in this case disposed in relation to the supporting body 4 in such a way that their width dimension b lies perpendicular to the main plane, while their height dimension h lies parallel to the main plane and parallel to the connecting elements 2 in the area of the clearance 8. The supporting feet 5 can therefore be inserted into grooves in a housing and can then be encapsulated with a sealing material, by which the temperature sensor is fixed with a predefined alignment in the housing.

For the purpose of installation, the temperature sensor, together with other temperature sensors, are supplied as bulk goods. In order to prevent the temperature sensors from catching in one another, it must be ensured that neither the sensor element 1 nor the supporting feet 5 can penetrate into the clearance 8 in adjacent temperature sensors.

As indicated schematically in the drawing, the temperature element 1 has a diameter a. If the sensor element 1 has a form which deviates from the sphere, then a designates the minimum dimension of the sensor element 1. The clearance 8 has a clear height d and a width c.

In order to prevent the temperature sensors from catching in one another, the minimum dimension a of the sensor element 1 and the width b and height h of the supporting feet 5 must be dimensioned, relative to the clearance 8, such that with any alignment of the temperature sensors relative to one another, neither the sensor element 1 nor one of the supporting feet 5 of one temperature sensor can penetrate into the clearance 8 in an adjacent temperature sensor. In order to achieve this, the below described geometric relationships should expediently be complied with.

If the height d of the clearance is greater than the width c of the clearance 8, the following inequalities should be satisfied:

$$b>d \text{ and } h>d \text{ and } a>c$$

and, for the case in which the height d of the clearance is less than the width c of the clearance 8, $$b>c \text{ and } h>c \text{ and } a>d.$$

As has been shown in practice, these geometric relationships are sufficient to prevent the temperature sensors from catching in one another. Even if, for example, the supporting feet of one temperature sensor are located obliquely (that is to say diagonally) in relation to the clearance of an adjacent temperature sensor, they cannot penetrate into the clearance 8 because of their finite thickness or rounding in the area of the bridge section 6.

The temperature sensors can therefore be supplied without difficulty as bulk goods and can then be assembled completely automatically in their associated housings.

We claim:

1. A sensor device, comprising;
   a sensor element having a substantially spherical shape with a minimum dimension;
   two wire-shaped connectors extending from said sensor element in straight lines, said two wire-shaped connectors running substantially parallel to and spaced from one another; and
   a supporting element having a supporting body through which said wire-shaped connectors extend, and a supporting foot integral with said supporting body to support the sensor device;
   said two wire-shaped connectors, said sensor element and said supporting body confining between themselves a free space lying in a plane and being of a predefined width and a predefined height;
   said supporting foot being a substantially plate-shaped part with a predefined length dimension and a predefined height dimension and being oriented such that said predetermined length dimension being traverse to said plane of said free space and said height dimension being parallel to said straight lines;
   said minimum dimension of said sensor element and said predefined length dimension and said height dimension of said supporting foot being dimensioned, in relation to said free space, such that neither said sensor element nor said supporting foot can enter a free space having equivalent dimensions of said above-mentioned free space.

2. The sensor device according to claim 1, wherein:
   if said height of said free space is greater than said width of said free space, then:

$$b>d, h>d \text{ and } a>c;$$

if said height of said free space is smaller than said width of said free space, then:

$$b>c, h>c \text{ and } a>d;$$

where:
   a is said minimum dimension of said sensor element,
   b is said defined length dimension of said supporting foot,
   c is said width of said free space, d is said height of said free space, and h is said height dimension of said supporting foot.

3. The sensor device according to claim 1, wherein said supporting body together with said free space lies in a main plane of the sensor device.

4. The sensor device according to claim 3, wherein:

said supporting body has a first end and a second end opposite said first end; and said two wire-shaped connectors lie in said main plane and are led through said supporting body, running in said straight line from said first end of said supporting body, and, bent at right angles to this, emerge from said second end of said supporting body.

5. The sensor device according to claim 4, wherein said supporting foot is integrally molded on said second end of said supporting body.

6. The sensor device according to claim 1, wherein said supporting foot is one of two identical supporting feet, which run parallel to and at a distance from each other, and are integrally molded on said supporting body.

7. The sensor device according to claim 3, wherein said supporting element has a bridge-shaped section which, in said main plane, has a substantially U-shaped cross section, and said supporting foot is connected to said supporting body by said bridge-shaped section.

8. The sensor device according to claim 1, wherein the sensor device is a negative temperature coefficient resistance sensor device and said sensor element is a negative temperature coefficient capsule.

* * * * *

UNITED STATES PATENT AND TRADEMARK OFFICE
CERTIFICATE OF CORRECTION

PATENT NO.     : 6,666,077 B2
DATED          : December 23, 2003
INVENTOR(S)    : Klaus Bauer et al.

It is certified that error appears in the above-identified patent and that said Letters Patent is hereby corrected as shown below:

<u>Title page,</u>
Item [30], should read as follows:

-- [30]        Foreign Application Priority Data

Dec. 23, 1999          (DE)          ………….. 199 62 623 --

Signed and Sealed this

Sixteenth Day of March, 2004

JON W. DUDAS
*Acting Director of the United States Patent and Trademark Office*